(12) United States Patent
Ellis

(10) Patent No.: US 11,078,099 B1
(45) Date of Patent: Aug. 3, 2021

(54) BARGE WASHING WASTEWATER TREATMENT SYSTEM

(71) Applicant: Rickie L. Ellis, Blytheville, AR (US)

(72) Inventor: Rickie L. Ellis, Blytheville, AR (US)

( * ) Notice: Subject to any disclaimer, the term of this patent is extended or adjusted under 35 U.S.C. 154(b) by 7 days.

(21) Appl. No.: 16/529,178

(22) Filed: Aug. 1, 2019

Related U.S. Application Data

(60) Provisional application No. 62/713,219, filed on Aug. 1, 2018.

(51) Int. Cl.
*C02F 9/00* (2006.01)
*C02F 1/00* (2006.01)
*C02F 103/00* (2006.01)

(52) U.S. Cl.
CPC .......... *C02F 9/00* (2013.01); *C02F 2001/007* (2013.01); *C02F 2103/008* (2013.01); *C02F 2201/002* (2013.01); *C02F 2301/08* (2013.01)

(58) Field of Classification Search
CPC .. C02F 9/00; C02F 2301/08; C02F 2201/002; C02F 2001/007; C02F 2103/008; C02F 1/00; B01D 17/0208; B01D 21/003; B01D 21/0039; B01D 29/56
USPC ... 210/600, 747.5, 747.6, 513, 521, 522, 97, 210/109, 167.31, 170.05, 170.09, 170.1, 210/191, 194, 195.1, 197, 322, 335
See application file for complete search history.

(56) References Cited

U.S. PATENT DOCUMENTS

| | | | |
|---|---|---|---|
| 5,908,040 A * | 6/1999 | Defraites, Jr. .......... | B63B 57/02 134/10 |
| 2011/0297620 A1* | 12/2011 | Lee .................... | B01D 17/0211 210/703 |

* cited by examiner

*Primary Examiner* — Madeline Gonzalez
(74) *Attorney, Agent, or Firm* — Joe D. Calhoun

(57) ABSTRACT

A system for using water pumped from a waterway to clean a barge, then filtering the wastewater through several successive filtration/sedimentation compartments on a barge floating beside the barge being cleaned, then discharging the multiple-filtered water directly back into the waterway. The sediment collected in the filtration/sedimentation compartments can then be disposed of.

16 Claims, 5 Drawing Sheets

BARGE WASHING WASTEWATER TREATMENT SYSTEM

CROSS REFERENCE TO RELATED APPLICATIONS

This utility patent application is a continuation of, and claims the benefit of the filing date of, provisional application No. 62/713,219 filed 1 Aug. 2018, which is incorporated herein.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to the processing of wastewater resulting from the washing of river barges. More particularly, the invention disclosed herein relates to the treatment of such wastewater sufficient to allow discharge into the river or other waterway without further processing.

(2) Background of the Invention

River barges typically encounter a wide variety of dirt, industrial waste and grit while in use. They therefore need to be cleaned periodically, for re-use. However, given the size and location of river barges, it is usually not economically feasible to transport the barge to a washing facility. Accordingly, there is a need for a washing wastewater treatment facility that may be transported to the barge.

One problem encountered by such mobile treatment facilities it that federal regulations require that any fluid to be discharged into the waterway must satisfy regulatory clean-water requirements. Accordingly, there is a need for a washing wastewater treatment facility that can treat the wastewater sufficiently to allow direct discharge into the waterway.

SUMMARY OF THE INVENTION

In general, the invention disclosed herein includes (comprises) a 4-tier water filtration system, with a wash water discharge outlet to the waterway. The filtration system is essentially a river barge, retrofitted to have four adjacent compartments, each having different fluid pathways between adjacent compartments. Wastewater is pumped into compartment 1, which has one or more fluid pathways (holes, with or without screens) close to the top of the wall separating compartment 1 from compartment 2. As the wastewater flows into compartment 1, and slowly begins filling it, particulate waste falls to the bottom of the compartments. When the water level nears the bottom of the fluid pathways into compartment 2, the water nearest the top contains fewer waste particles than water at lower levels within compartment 1. The cleaner top water rises to the level of the fluid pathways, and flows through them into compartment 2, and begins filling compartment 2.

When the water level in compartment 2 nears the bottom of the fluid pathways into compartment 3 (which are lower than between compartments 1 and 2), the water nearest the top contains even fewer waste particles than water at lower levels within compartment 2. The cleaner top water eventually rises to the level of the fluid pathways between compartment 2 and compartment 3, and flows through the fluid pathways into compartment 3, where the process is repeated.

The third compartment also functions to remove oil, grease or other matter that typically rises towards or floats upon the top of water. When the water level in compartment 3 nears the bottom of the fluid pathways into compartment 4, the water nearest the top contains even fewer waste particles than water at lower levels within compartment 3, but it may contain small amounts of oil or grease near or on the top. Therefore, the fluid pathways between compartments 3 and 4 are lower than the mouth of the discharge outlet of compartment 4. The water eventually rises to above the level of the fluid pathways between compartment 3 and compartment 4, allowing water between the top and bottom to flow through the fluid pathways into compartment 4, where processing is completed. When the water level in compartment 4 nears the bottom of the water discharge outlet(s) to the river, the water nearest the top contains even fewer waste particles and floating matter than water at intermediate levels within compartment 3. The cleaner top water eventually rises to the level of the water discharge outlet(s) and is discharged into the waterway. The flow rate of wastewater into compartment 1, and into successive compartments, may be adjusted so that testing will confirm that the discharge water satisfies the federal regulations governing the quality of water discharged into a waterway.

One primary benefit of the disclosed invention is that it provides a washing wastewater treatment facility that may be transported to the barge.

Another benefit of the disclosed invention is that it provides a washing wastewater treatment facility that can treat the wastewater sufficiently to allow direct discharge into the waterway.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims filed now or later.

BRIEF DESCRIPTION OF THE DRAWINGS

The novel features believed characteristic of the disclosed subject matter will be set forth in the claims. The disclosed subject matter itself, however, as well as a preferred mode of use, further objectives, and advantages thereof, will best be understood by reference to the following detailed description of an illustrative embodiment when read in conjunction with the accompanying drawings.

(21) as higher than fluid pathways between compartments 2 and 3, which are higher than fluid pathways between compartments 3 (31) and 4, which are lower than fluid pathways (fail-safe pathways) between compartments 4 (41) and 1.

Figure 1:
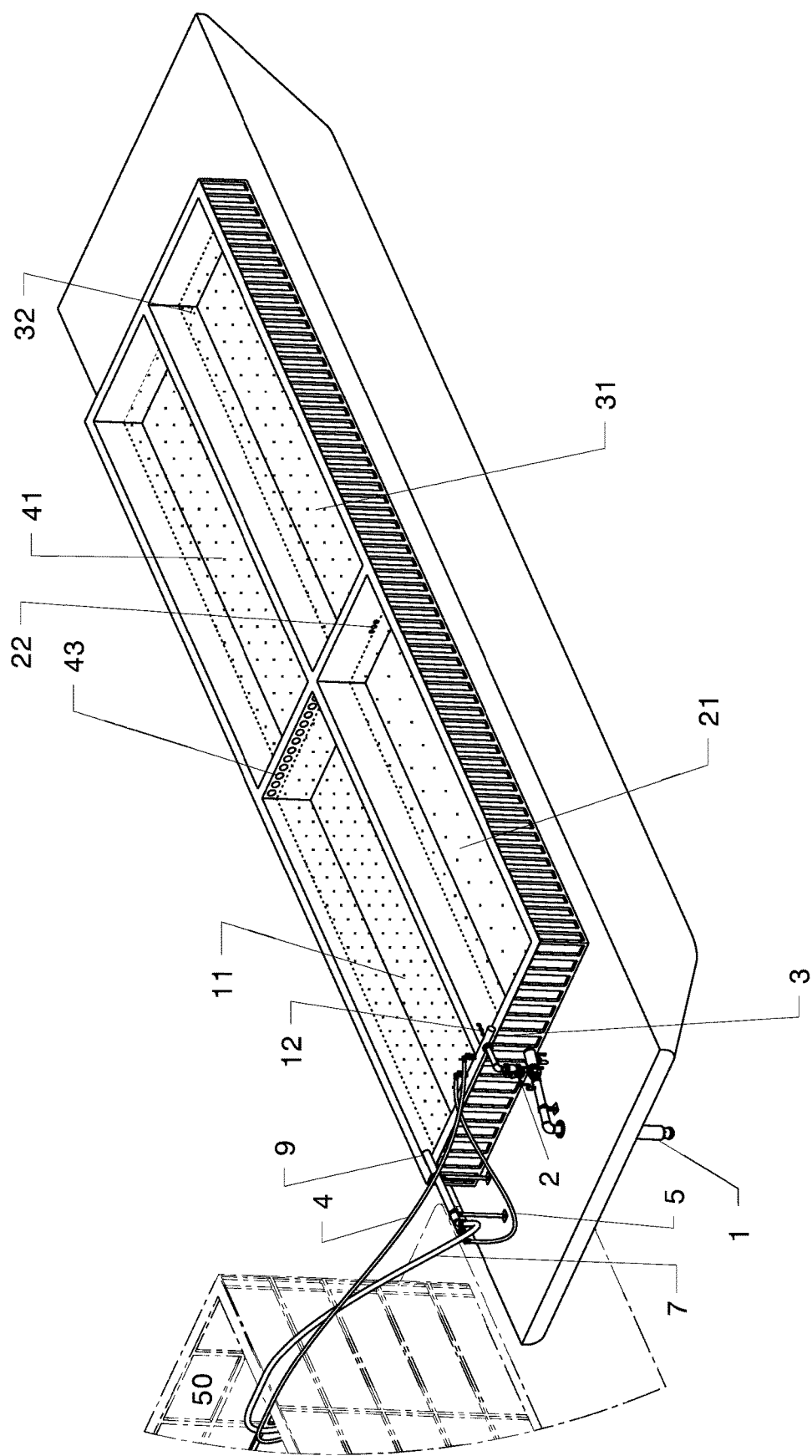
FIG. 1 is a perspective view depicting a representative sample of one embodiment of the filtration barge fully loaded with water being filtered, moored beside a standard empty barge to be cleaned (in broken lines); also shown are fluid pathways from compartment 1 (11) to compartment 2
Figure 2:
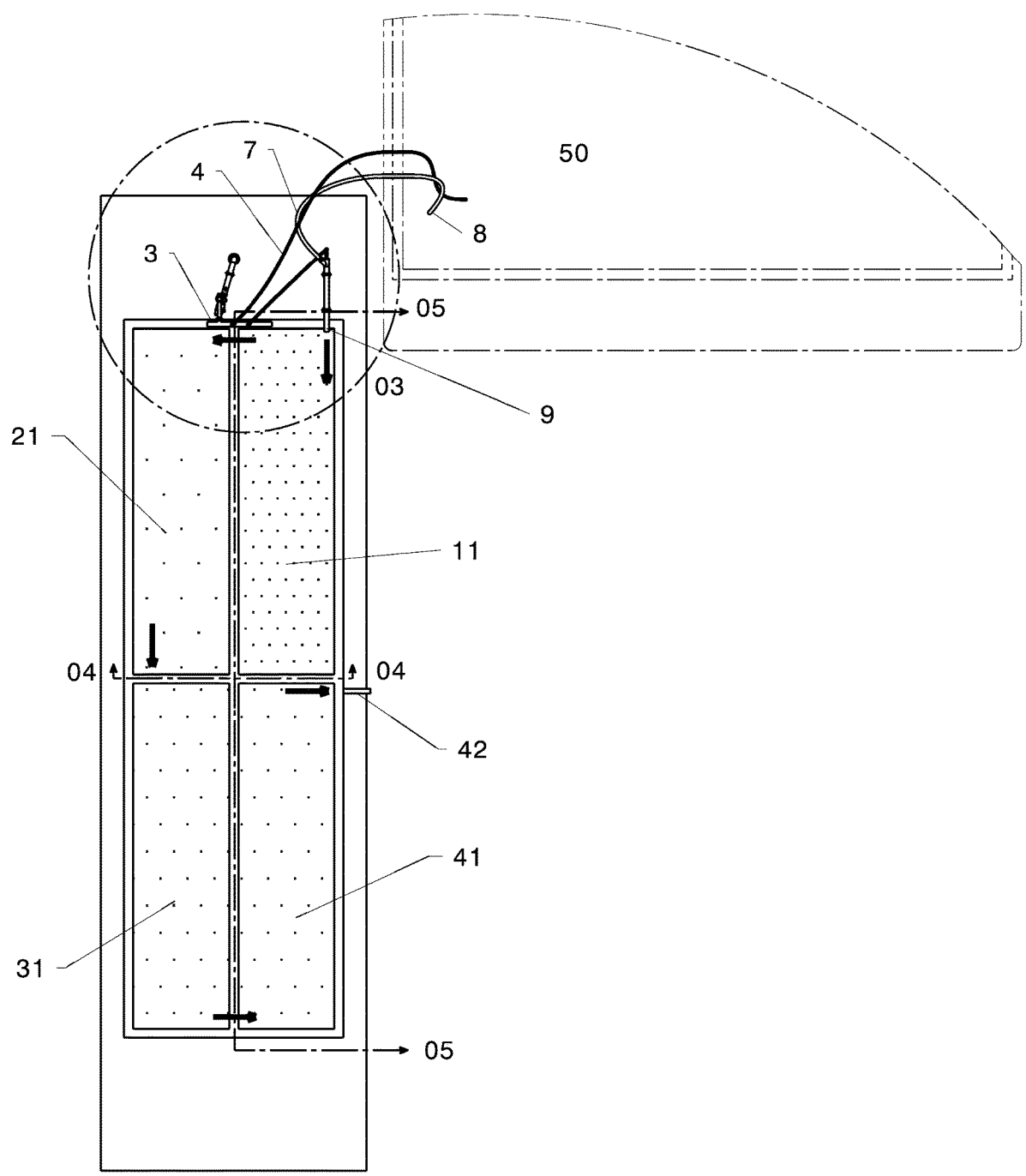

FIG. 2 is a top plan view of the filtration barge of FIG. 1 showing, among other things, the direction of water flow.

Figure 3:
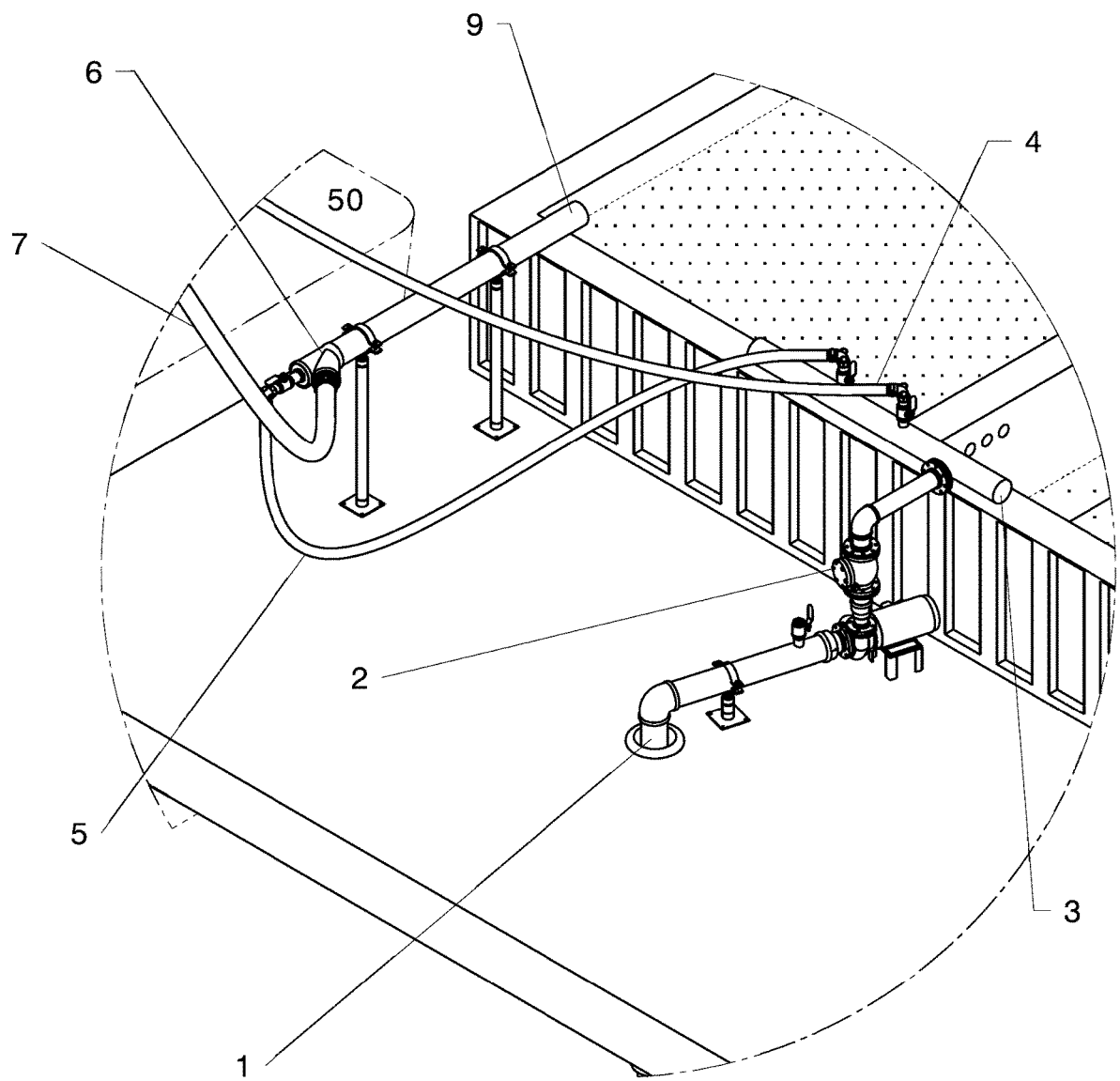

FIG. 3 is a perspective closeup view of the encircled portion of FIG. 2 showing, among other things, the pumping mechanisms for the supply of wastewater.

Figure 4:
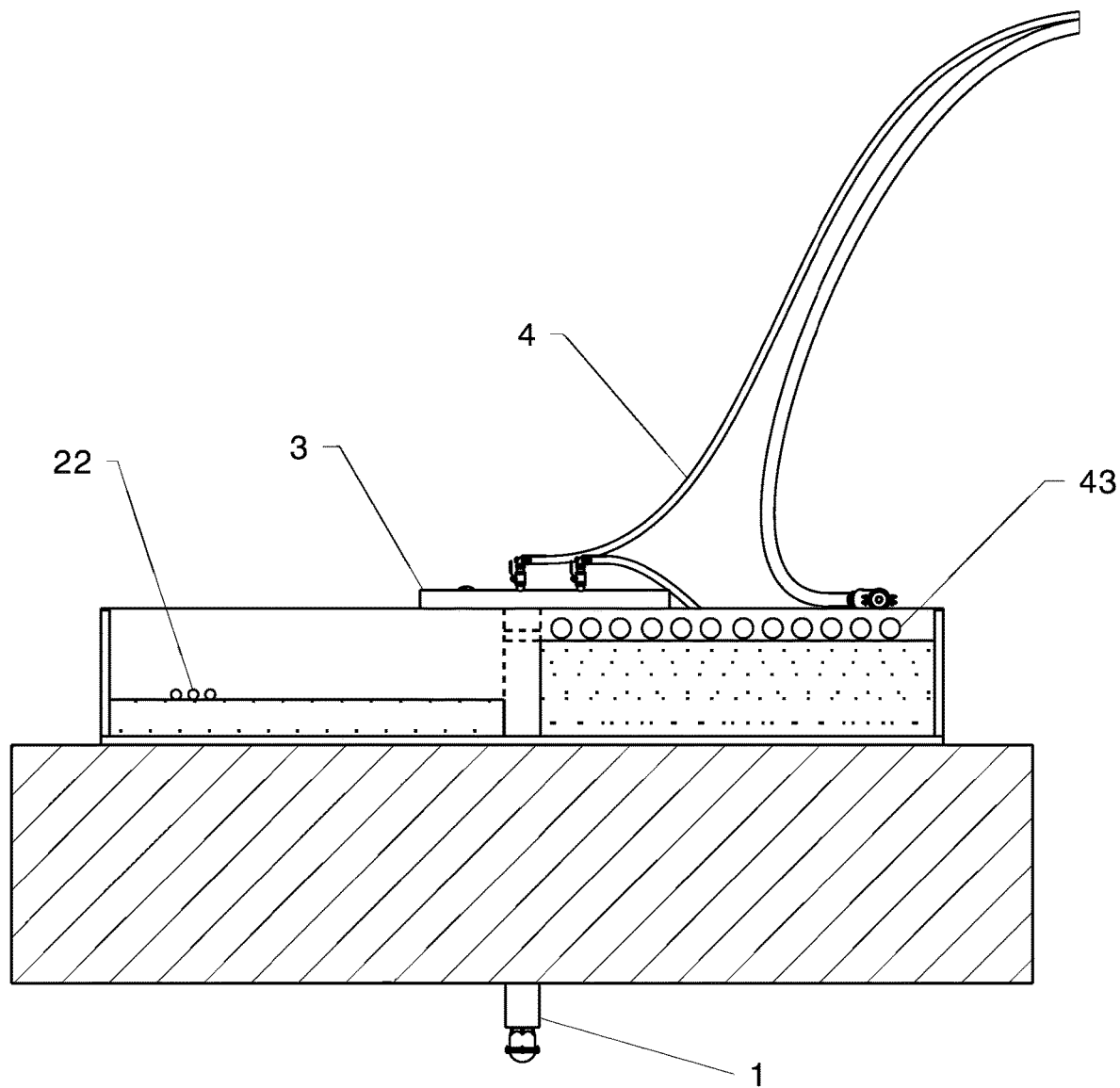

FIG. 4 is a cross-section view of the filtration barge at plane 04-04 of FIG. 2 showing, among other things, the water level in compartment 1 at the fluid pathways into compartment 2, and showing the water level in compartment 2 at the fluid pathways into compartment 3.

Figure 5:
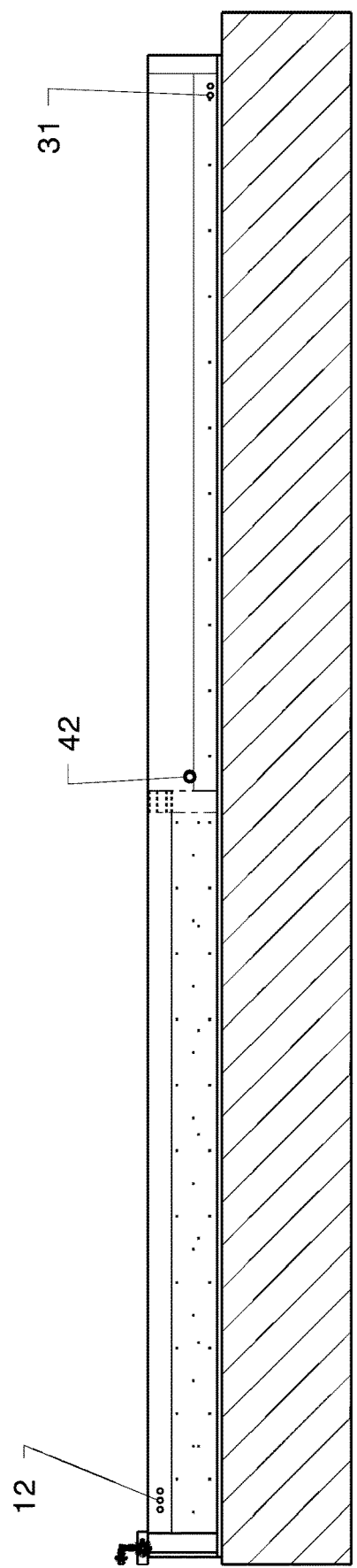

FIG. 5 is a cross-section view of the filtration barge at plane 05-05 of FIG. 2 showing, among other things, the water level in compartment 3 at the fluid pathways into compartment 4, and showing the water level in compartment 4 at the fluid discharge pipe level.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise; for example, fluid pathway can mean either a single pathway or multiple pathways. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The disclosure herein is not limited by construction materials to the extent that other materials satisfy the structural and/or functional requirements. For example, any material may be used so long as it satisfies the functional and structural requirements for which it is being used. In one embodiment, the device and/or system is constructed of steel or other structural metallic material; however, any material may suffice as well, if it satisfies the functional and structural requirements for which it is being used. Likewise, the disclosed invention is not limited by any construction process or method.

With reference to FIGS. 1 and 2, the following is a representative sample of a sequence of operation.

Using pump (2), water from a waterway is pumped through line (4) into the "dirty" barge (50), for washing. Once that barge has been cleaned, the valve at the manifold (3) (distributing river water leaving the pump) is changed, and pump water is pumped through line (5) and into the venturi eductor (6) and out the exit end (9); this creates a vacuum in conduit (7) between the barge being cleaned and the venturi eductor (6), to suck the wastewater out of the barge being cleaned and pumping it into the settling/filtration barge through the exit end (9) of the water "cannon" (6). Alternately, the vacuum may be created by passage of water from line (5) into the venturi eductor (6) and discharged back into the river.

After leaving the cleaned barge, the wastewater flows through each of the 4 settling chambers (11, 21, 31 and 41) on the settling/filtration barge, then out into the river through discharge opening (42).

The level or height of the fluid pathway opening(s) between settling compartments/reservoirs 1 (11) and 2 (21) are higher than the opening(s) between compartments/reservoirs 2 and 3 (31), to promote one-way flow from one compartment/reservoir to the next at a rate that creates pressure that pushes water through the filtration system without exceeding the water discharge capacity enough to reverse that pressure.

The duration allowed for settling of particles is achieved in each such compartment based on the volume of water and the flow into and out of the compartment. Preferably, the water flow re is an equal flow into each such compartment. Removal of small amounts of floating matter such as oil and grease is accomplished in compartment/reservoir 3, having water pathways into compartment/reservoir 4 that are lower than the mouth of the discharge outlet. Typically the water flow into compartment/reservoir 3 is greater than water flow out of compartment reservoir 3, so that the water level in compartment/reservoir 3 rises above the fluid pathways (32). At that time, water passing into compartment/reservoir 4 is beneath the upper layer of water, more free of floating matter.

There are openings (43) in the wall separating compartments 1 and 4, which are at a higher level than the openings (12) in the wall separating compartments 1 and 2. These provide a "fail-safe" feature allowing water to be retained in the filtration barge even if the discharge opening (or fluid pathways between compartments) are blocked. There may be a similar set of openings in the wall separating compartments 3 and 4.

Over time, particles build up on the bottom of the settling basins and are cleaned out and disposed.

The prototype filtration barge is built out of an old shell of a barge (SD252) which has been retrofitted to include 4 sediment compartments or reservoirs for filtering out the particulate material suspended in the barge cleaning wastewater.

Compartment 1 filters out the large or heaviest particulate material, that settles to the bottom of the compartment relatively quickly after being pumped into the compartment.

Compartment 2 filters out the medium-weight material that was not captured in the first compartment.

Compartment 3 filters out matter such as oil and grease that typically floats near the top of water, in addition to filtering out the smaller or lighter-weight material that was not captured in compartment 1 and compartment 2.

Compartment 4 filters out any remaining debris (if any) and discharges the water back into the river.

The system is pressured by river water with a 6-inch electrical 40 HP pump with an 8-inch distribution manifold. Water from the river is first pumped into the intake pipe (1) and into the pump (2), then into the manifold (3). Alternatively, the wash water may be pumped into the intake pipe and into a a well (not shown) stationed on the filtration barge, and then pumped to the manifold (3) for additional pressure. The waterflow coming from the manifold flows through washing hose (4) into the barge being cleaned, where the water picks up the dirt, debris and other particulate matter for removal. A venturi eductor (6) acting as a water cannon suctions the water/debris (wastewater) from the cleaned barge, and pumps it into the first compartment/reservoir (11) aboard the filtration barge. The first compartment/reservoir has holes (12) in the compartment wall that allow the water to flow to the second compartment/reservoir (21). Gravity and the passage of time causes particulate matter in the wastewater to descend, eventually settling on the floor of the respective reservoir. The passage of cleaner water through the fluid pathways (12) near the top of the wall separating compartment 1 and compartment 2 continues the process for filtering out particulate material. Each compartment/reservoir has a horizontal row of holes or slots in the wall separating it from an adjacent compartment/reservoir, allowing the water to flow to each downstream sediment compartment/reservoir for filtering. The water in the fourth compartment/reservoir (41) has been sequentially filtered through the other compartments/reservoirs and fluid pathways, and particulate matter has had multiple chances to settle below the level of top water making it through the fluid pathways. This last amount of multiple-filtered water flows through a discharge pipe (42) overboard and back into the river.

One general embodiment of the invention disclosed herein comprises (includes) a system for filtering particulate matter from wastewater obtained from washing a barge or other vessel, for return of wash water to the waterway. The system may include a filtration vessel floating in the waterway and divided into a plurality of separate filtration reservoirs for containing wastewater while gravity filtration occurs. (Filtration is achieved by gravity causing the particulate material in the wastewater to settle on the bottom, whereas water more free of particles will flow into the next reservoir.) Each of the reservoirs may have a fluid pathway into an adjacent separate reservoir, the reservoirs including:

(a) a first reservoir accepting wastewater, including a first fluid pathway into another
reservoir at a first water level, gravity causing particulate matter in the wastewater to settle to the bottom of the first reservoir before the wastewater flows through the first fluid pathway; and (b) the other reservoir including a water discharge outlet for discharging wash water into the waterway after the removal of particulate matter.

In another embodiment of the wastewater filtering system, the plurality of separate filtration reservoirs may include at least three separate reservoirs and wherein:

(a) the first reservoir comprises a first fluid pathway into an adjacent second reservoir at the first water level; and (b) the second reservoir comprises a second fluid pathway into the other reservoir at a second water level which is lower than the first water level, gravity causing additional particulate matter in the wastewater to settle to the bottom of the second reservoir before the wastewater flows through the second fluid pathway.

The other reservoir of the wastewater filtering system further may include a fail-safe fluid pathway into the first reservoir at a fail-safe water level higher than the first water level, allowing water to drain into the first reservoir if the water discharge outlet is blocked.

In another embodiment of the wastewater filtering system, depicted in FIGS. 1-5, the plurality of separate filtration reservoirs may include at least four separate reservoirs (11, 21, 31, and 41). The second reservoir comprises a second fluid pathway (22) into an adjacent third reservoir at the second water level; and the third reservoir comprises a third fluid pathway (32) into the other reservoir (41) at a third water level which is lower than the second water level. Gravity will cause additional particulate matter in the wastewater to settle to the bottom of the third reservoir before the wastewater flows through the third fluid pathway.

The other reservoir further may include a fail-safe fluid pathway (43) into the first reservoir at a fail-safe water level higher than the first water level, allowing water to drain into the first reservoir if the water discharge outlet is blocked.

The fluid pathways in all reservoirs may include a plurality of holes or slots aligned horizontally along a wall separating adjacent reservoirs.

Preferably the acceptance of wastewater into the first reservoir occurs at a rate that pushes water through the fluid pathways without exceeding the water discharge capacity enough to substantially counteract the one-way flow of water through the system. The acceptance of wastewater into the first reservoir preferably occurs at a rate that results in a settling filtration of particulate matter sufficient to result in the discharged water satisfying regulations governing the discharge of water into the waterway.

One prototype filtration barge is about 110 feet long by 30 feet wide, and it has a draft of about 7 feet. The container dimensions within the barge are about 80 feet long by 25 feet wide, and about 4 feet deep. Accordingly, each of the four reservoirs are about 40 feet long by 12.5 feet wide, and about 4 feet deep.

The wash water intake pipe has a lumen of about 8 inches in diameter, and it is about 12 feet long to extend from at least the bottom of barge upward to reach the pump above the deck; en route to the pump, it may pass through a tank or well in the bow of the filtration barge, and its lumen may be reduced such as (for example) to about 6 inches in diameter. Between the pump and the intake pipe there may be a pipe or hose having a reduced lumen, preferably about 4 inches in diameter.

The fluid pathways between the first reservoir and the second reservoir may be three or more holes sharing a common horizontal plane, each about 6 inches in diameter and having the lower lip of the hole about 34 inches from the floor of the reservoir. The fluid pathways between the second reservoir and the third reservoir may be three or more coplanar holes, each about 6 inches in diameter and having the lower lip of the hole about 14 inches from the floor of the reservoir. The fluid pathways between the third reservoir and the fourth reservoir may be two or more coplanar holes, each about 6 inches in diameter and having the lower lip of the hole about 6 inches from the floor of the reservoir. The discharge outlet may be a 14 inch long pipe (or longer) having a diameter of about 6 inches, having a lower lip about 18 inches above the reservoir floor and extending out the outer wall of the fourth reservoir so that discharged water does not hit the barge en route to the waterway into which it is being discharged; there may also be a drop from the interior mouth of the discharge pipe to its exterior mouth, preferably about 1 inch.

The manifold may be a pipe about 8 feet long and having a lumen of about 8 inches in diameter; it may also have two 1.5 inch quick couplings, and two 2 inch quick couplings, for the wash hose used for washing the dirty barge and the feed hose for feeding the water cannon for supplying wastewater to the first settling tank of the filtration barge.

The wash water is pumped by a Berkley type B closed-coupled end-suction centrifugal pump with a Baldor Reliancer Super-E 40 h.p. motor (3510 rpm), from the waterway at the rate of about 340 gallons per minute. The first reservoir also receives a mixed flow of wash water and wastewater, via the water cannon, at the rate of about 340 gallons per minute. The discharge outlet discharges at the rate of about 527 gallons per minute.

Another embodiment of the wastewater filtering system further may include a wastewater supply subsystem including, as best depicted in FIG. 3, a pump (2) receiving wash water from an intake pipe (1) submerged in the waterway and pumping the wash water into a manifold (3) directing pumped water through a feed hose (5) into a venturi eductor (6) having an exit end (9) pumping water into the first reservoir (11) of the filtration vessel. That flow of water through the venturi eductor creates a vacuum in conduit (7) connected at one end to the venturi eductor and having a suction end (8) submerged in the wastewater in the barge, thereby pumping the wastewater out of the barge and through the exit end (9) of the water cannon and into the first reservoir.

The manifold (3) may have a bi-directional valve alternatively directing pumped water through a washing hose (4) to the barge to be cleaned.

One more specific embodiment of the system for filtering particulate matter from wastewater generated from washing the interior of a barge, for return of filtered wash water to the waterway, may include a filtration vessel divided into a plurality of separate filtration reservoirs for containing the wastewater while gravity filtration occurs. It may include a wastewater supply subsystem including a pump having an intake pipe submerged in the waterway and having a bi-directional manifold directing pumped water through a washing hose to the barge. Alternatively, the manifold directs the pumped wash water through a venturi eductor releasing pumped water into the first settling reservoir of the filtration vessel; concurrently, there is a conduit having one end connected to the venturi eductor, and having a suction end submerged in the wastewater in the barge. The flow of wash water from the washing hose out the water cannon creates a vacuum sucking the wastewater from the barge, through the conduit and into the water cannon, where it commingles with the wash water and exits the exit end (9). Each of the separate filtration reservoirs may have a separate fluid pathway into an adjacent separate filtration reservoir. The reservoirs may include:

(a) a first reservoir accepting wastewater from the exit end of the wastewater supply subsystem and having a first fluid pathway into an adjacent second reservoir at a first water level, gravity causing some particulate matter in the wastewater to settle to the bottom of the first reservoir before the wastewater flows through the first fluid pathway;

(b) the second reservoir having a second fluid pathway into an adjacent third reservoir at a second water level which is lower than the first water level, gravity causing additional particulate matter in the wastewater to settle to the bottom of the second reservoir before the wastewater flows through the second fluid pathway;

(c) the third reservoir having a third fluid pathway into an adjacent discharge reservoir at a third water level which is lower than the second water level, gravity causing additional particulate matter in the wastewater to settle to the bottom of the third reservoir before the wastewater flows through the third fluid pathway; and (d) the discharge reservoir having a water discharge outlet for discharging wash water into the waterway after the removal of particulate matter.

The discharge reservoir further may include a fail-safe fluid pathway into the first reservoir at a fail-safe water level higher than the first water level, allowing water to drain into the first reservoir if the water discharge outlet is blocked.

Preferably the acceptance of wastewater into the first reservoir occurs at a rate that is sufficient to push water through the fluid pathways, but does not greatly exceed the passage of wastewater through the fluid pathways. The acceptance of wastewater into the first reservoir preferably occurs at a rate that results in a settling filtration of particulate matter sufficient to result in the discharged water satisfying regulations governing the discharge of water into the waterway.

Besides the apparatus and systems disclosed herein, the invention includes a method of deploying the apparatus and system, as set forth hereinabove. Other utility and advantages will be apparent to somebody of ordinary skill in the field, upon a review

I claim:

1. A system for filtering particulate matter from wastewater obtained from washing a barge or other vessel, for return of wash water to the waterway, said system comprising a filtration vessel divided into a plurality of separate filtration reservoirs for containing wastewater while filtration occurs, each of said reservoirs having a fluid pathway for wastewater flow into an adjacent filtration reservoir, said reservoirs comprising:

(a) a first reservoir accepting wastewater and comprising a first fluid pathway into another filtration reservoir at a first water level, gravity causing particulate matter in the wastewater to settle of in the first reservoir before the wastewater flows through the first fluid pathway; and (b) said other filtration reservoir comprising a lower water discharge outlet for discharging wash water into the waterway after the removal of particulate matter, and a fail-safe fluid pathway into said first reservoir at a fail-safe water level higher than said first water level, allowing water to drain into the first reservoir if said water discharge outlet is blocked.

2. A wastewater filtering system described in claim 1, said plurality of separate filtration reservoirs comprising at least three separate reservoirs and wherein:

(a) said first reservoir comprises a first fluid pathway into an adjacent second reservoir at said first water level; and (b) the second reservoir comprises a second fluid pathway into said other reservoir at a second water level which is lower than the first water level, gravity causing additional particulate matter in the wastewater to settle in the second reservoir before the wastewater flows through the second fluid pathway.

3. A wastewater filtering system described in claim 2, at least one of said fluid pathways comprising a plurality of holes or slots aligned horizontally along a wall separating adjacent reservoirs.

4. A wastewater filtering system described in claim 2, said acceptance of wastewater into said first reservoir occurring at a rate that pushes water through said fluid pathways without exceeding said water discharge enough to prevent wastewater flow through said fluid pathways.

5. A wastewater filtering system described in claim 1, said plurality of separate filtration reservoirs comprising at least four separate reservoirs and wherein:
   (a) a second reservoir comprises a second fluid pathway into an adjacent third reservoir at a second water level; and
   (b) the third reservoir comprises a third fluid pathway into said other reservoir at a third water level which is lower than the second water level, gravity causing additional particulate matter in the wastewater to settle in the third reservoir before the wastewater flows through the third fluid pathway.

6. A wastewater filtering system described in claim 5, said other reservoir further comprising a fail-safe fluid pathway into said first reservoir at a fail-safe water level higher than said first water level, allowing water to drain into the first reservoir if said water discharge outlet is blocked.

7. A wastewater filtering system described in claim 5, said water discharge outlet allowing a higher water level in said other reservoir than in said third reservoir.

8. A wastewater filtering system described in claim 1, said acceptance of wastewater into said first reservoir occurring at a rate that results in a settling filtration of particulate matter sufficient to result in the wash water satisfying regulations governing the discharge of water into the waterway.

9. A wastewater filtering system described in claim 1, further comprising a wastewater supply subsystem including a pump having an intake pipe submerged in the waterway and having a manifold directing pumped water through a feed hose into a venturi eductor having an exit end releasing said water into said first reservoir, and having a conduit having one end in fluid communication with the venturi eductor and a suction end submerged in the wastewater in the barge, wherein directing pumped water through the venturi eductor creates a vacuum in the conduit causing suction of wastewater out of the barge and through the exit end into the first reservoir.

10. A wastewater filtering system described in claim 9, wherein said manifold comprises a manifold alternatively directing pumped water through a washing hose to the barge to be cleaned.

11. A system for filtering particulate matter from wastewater generated from washing the interior of a barge, for return of filtered wash water to the waterway, said system comprising a filtration vessel divided into a plurality of separate filtration reservoirs for containing the wastewater while gravity filtration occurs, and comprising a wastewater supply subsystem comprising a pump in fluid communication with an intake pipe submerged in the waterway and with a manifold directing pumped water alternatively through a washing hose to the barge or through a venturi eductor having an exit end and having a conduit having one end in fluid communication with the venturi eductor and a suction end submerged in the wastewater in the barge, each of said separate filtration reservoirs having a separate fluid pathway into an adjacent separate filtration reservoir, said reservoirs including:
   (a) a first reservoir accepting wastewater from the exit end of the wastewater supply subsystem and comprising a first fluid pathway for wastewater flow into an adjacent second reservoir at a first water level, gravity causing some particulate matter in the wastewater to settle therein;
   (b) the second reservoir comprises a second fluid pathway for wastewater flow into an adjacent third reservoir at a second water level which is lower than the first water level, gravity causing additional particulate matter in the wastewater to settle therein;
   (c) the third reservoir comprises a third fluid pathway for wastewater flow into an adjacent discharge reservoir at a third water level which is lower than the second water level, gravity causing additional particulate matter in the wastewater to settle therein; and
   (d) the discharge reservoir comprising a water discharge outlet for discharging wash water into the waterway after the removal of particulate matter;
   (e) wherein directing pumped water through the venturi eductor creates a vacuum in the conduit causing suction of wastewater out of the barge and through the exit end into the first reservoir to commence the filtration.

12. A wastewater filtering system described in claim 11, said discharge reservoir further comprising a fail-safe fluid pathway into said first reservoir at a fail-safe water level higher than said first water level, allowing water to drain into the first reservoir if said water discharge outlet is blocked.

13. A wastewater filtering system described in claim 11, said water discharge outlet allowing a higher water level in said other reservoir than in said third reservoir.

14. A wastewater filtering system described in claim 11, said acceptance of wastewater into said first reservoir occurring at a rate that pushes water through said fluid pathways without exceeding said water discharge enough to prevent wastewater flow through said fluid pathways.

15. A wastewater filtering system described in claim 11, said acceptance of wastewater into said first reservoir occurring at a rate that results in a settling filtration of particulate matter sufficient to result in the wash water satisfying regulations governing the discharge of water into the waterway.

16. A wastewater filtering system described in claim 11, said manifold initially directing pumped water through said washing hose to the barge to commence cleaning.

* * * * *